Jan. 3, 1967   I. L. NELSON   3,295,660
PALLET HANDLING APPARATUS
Filed March 12, 1965   5 Sheets-Sheet 2

FIG. 2

INVENTOR
IVER L. NELSON
BY
ATTORNEY

Jan. 3, 1967  I. L. NELSON  3,295,660
PALLET HANDLING APPARATUS
Filed March 12, 1965  5 Sheets-Sheet 3

INVENTOR
IVER L. NELSON
BY
ATTORNEY

INVENTOR
IVER L. NELSON

3,295,660
PALLET HANDLING APPARATUS
Iver L. Nelson, Minneapolis, Minn., assignor to Waldorf Paper Products Company, St. Paul, Minn., a corporation of Minnesota
Filed Mar. 12, 1965, Ser. No. 439,243
10 Claims. (Cl. 198—33)

This invention relates to an improvement in pallet handling apparatus and deals particularly with a device useful in receiving stacks or loads of materials from a plurality of sources, and directing it to one or two discharge conveyors.

As the device, as constructed, was initially designed for use in handling stacks or pallet loads of corrugated containers, the device will be described in conjunction with such an operation. Obviously, the device is capable of use in countless other fields. Furthermore, the device described is capable of handling containers stacked upon a single sheet of corrugated board or other material as well as loads supported by pallets made of wood or other material. Accordingly, the use of the term "pallet" is meant to describe material positioned on wooden pallets, stacks of product supported upon a single sheet, or even a single stack of product where the product is provided with a flat undersurface capable of moving along a roller conveyor or the like.

Corrugated containers are usually shipped from the manufacturer in flat folded form, the container being stitched, glued, or taped at the manufacturer's joint by suitable automatic or semi-automatic apparatus. The containers leaving the stitching, gluing, or taping machines are usually tied in bundles to hold the containers flat, and the bundled containers are then stacked one upon the other. If the containers are of large dimensions, a single stack of bundles may be banded together with steel strapping or the like and transferred by suitable means such as a lift truck to a truck trailer or railroad car for shipment to the purchaser. If the containers are of smaller size, the bundles are stacked upon a pallet or upon a sheet of corrugated paperboard and the bundles are preferably arranged so that the bundles of one layer overlap two bundles of the next layer so that the bundles are dovetailed together. Suitable protective sheets are placed over the stacks, and the stacks are bundled by strapping them with properly spaced steel bands or the like.

During recent years, automatic banding machines have been produced which apply one or more bands about the bundle. As it is usually desirable to strap the pallets or stacks of product in two directions, the stacks or pallets are usually banded in one direction, moved from the banding machine to a turntable and turned 90°, and then returned to the bander for strapping in the second direction. Usually, the pallets or stacks are pushed manually on the turntable, turned manually at an angular distance of 90°, and then pushed back onto the driven portion of the conveyor which returns the load to the bander under power.

In general, the banding machines are provided with a compression plunger vertically supported above the load and movable downwardly to compress the load to a predetermined extent which is sufficient to hold the containers in proper position, but insufficient to compress them to the extent necessary to cause injury thereto. One or more bands are then fed automatically about the stack, and each band is automatically tightened about the load and clamped in load encircling position. The plunger then returns to its original position. The device is capable of accommodating loads of virtually any height, and the number of bands used to encircle the load may be controlled.

In view of the fact that the banding operation can be completed in considerably less time than is required to stitch, glue, or tape a pallet load of containers, the banding machine is usually capable of banding the output of a plurality of taping, gluing, or stitching machines. It is not always practical to position these machines along the length of a single conveyor, and the provision of a series of the large machines along a single conveyor requires a conveyor of a considerable length which tends to interfere with the access to these machines. Accordingly, it is a feature of the present invention to provide a device capable of receiving pallets or stacks of material for banding from two or three conveyors extending in right angular relation, and to transfer the pallets or loads to and from the banding machine and to deliver them to one or more outlet conveyors. In the particular illustration which will be described, two inlet conveyors and two outlet conveyors are provided.

A feature of the present invention resides in the provision of a pallet handling apparatus which includes powered rollers which may be used to move the pallets or stacks in either of two directions. The device is rotatable about a vertical axis so that loads on the transferring device may move the pallets or bundles onto or off the device. For example, a pallet may be moved onto the transferring device, rotated 90°, and moved onto a conveyor which is at 90° to the one on which the pallet or stack was previously supported.

A feature of the present invention resides in the provision of a turntable device mounted at the center of four radially extending conveyor sections having powered rollers capable of delivering pallets toward or away from the turntable. The two conveyor sections on opposite sides of the turntable preferably operate in unison so that a pallet may be transferred directly across the turntable from one side to the other thereof in either direction. Thus the pallet may be conveyed onto the turntable and then be returned in the same direction from which it came, may pass directly over the turntable, or may pass onto the turntable, be rotated 90°, and be discharged at right angular relation to the path on which it entered the turntable.

A further feature of the present invention resides in the provision of a turntable including an outer ring which may be rotated about its vertical axis and which includes driven rollers. This outer ring of driven rollers may be rotated so that the driven rollers are parallel to the rollers of any of the conveyors and may be driven in either direction to move the pallet. The turntable also includes a central table concentric with the outer ring and which may be raised or lowered independently of the outer ring, and which may also rotate or oscillate independently of the outer ring. As a result, the pallet may be moved onto the turntable by the outer section of driven rollers, moved over the center table of the turntable by operation of the driven rollers in the outer ring, may be lifted upwardly out of contact with the outer ring of rollers by the central table, rotated 90°, and lowered back onto the driven rollers of the outer ring, and then moved back into the same conveyor from which it is fed, to return the rotated load to the bander.

These and other objects and novel features of the present invention will be more clearly and fully set forth in the following specification and claims.

In the drawings, forming a part of the specification.

The apparatus which is illustrated is designed for use with four conveyor sections which are arranged in 90° relationship. It is believed obvious that by enlarging the turntable, a similar structure could be used in conjunction with six or eight angularly related conveyors. Also, in the arrangement illustrated, two of the four conveyor sections are designed as incoming conveyors and the remaining two as discharge conveyors. This is also a matter of choice for, if desired, three of the conveyors could be used to direct pallets toward the turntable while the remaining conveyor could form the single discharge.

Figure 1:
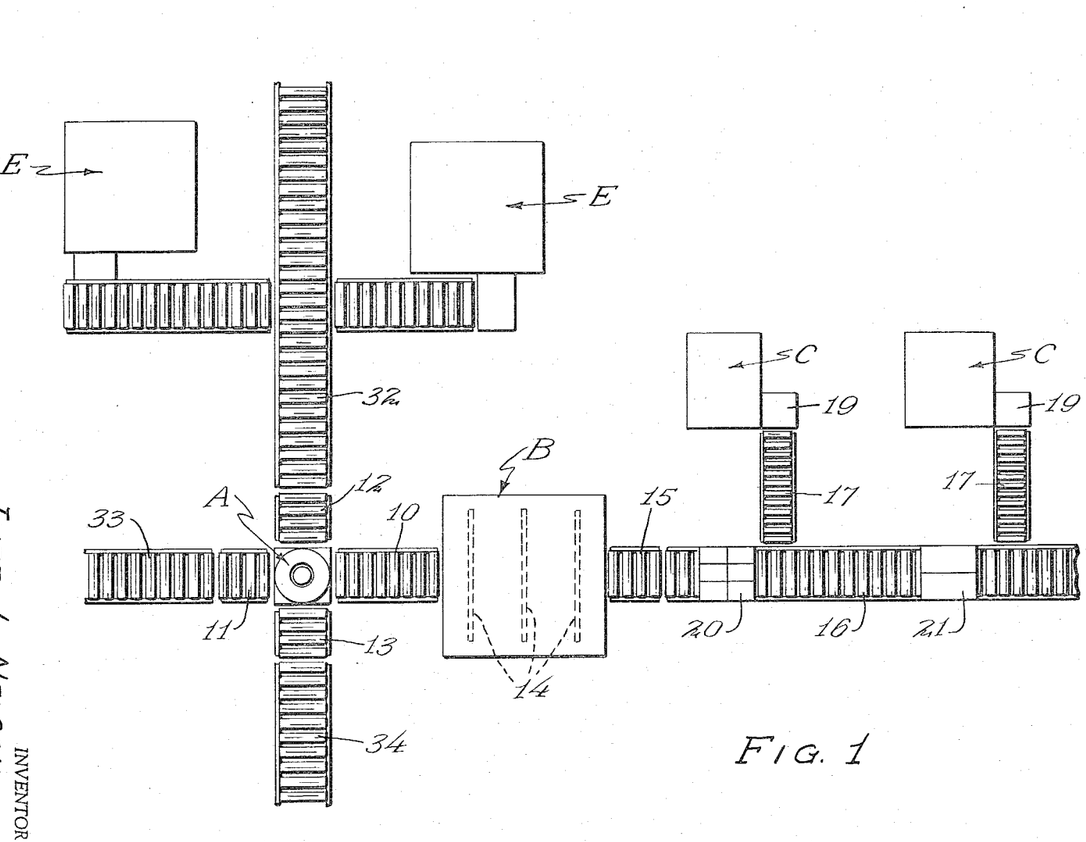
FIGURE 1 is a diagrammatic view showing a conveyor system including two right angular conveyors leading to the turntable structure at the intersection of the two conveyors, and showing an additional pair of conveyors in diametrically opposed relation to the first mentioned right angular conveyors.

FIGURE 1 of the drawings diagrammatically illustrates the turntable device A which is located at the center of a pair of right angularly arranged conveyor systems. A powered conveyor 10 is provided on one side of the turntable A and a similar powered conveyor 11 is provided on the opposite side thereof. A powered inlet conveyor 12 is provided at right angles to the conveyors 10 and 11 and an outlet powered conveyor 13 is provided in diametrically opposed relation to the inlet conveyor 12. The conveyor 10 connects the turntable A with the strapper or bander B which in itself is provided with powered conveyor rollers for positioning the pallet to receive the metal straps or bands. The dotted lines 14 extending across the bander B indicate tracks through which the metal strapping is fed as it encircles the load in the bander. The machine is constructed so that a predetermined number of bands may be fed simultaneously into load encircling position. For example, one, two, or three steel straps may be fed to simultaneously encircle the load by means of the tracks 14.

As the banders B are known in the art, they will not be described in detail. In general, these banders include a platform formed of rollers which may be rotated in either direction to place the pallet in proper position for strapping. The frame is generally rectangular extending upwardly on opposite sides of the conveyor table and across the top thereof. A plunger having a horizontal pressure plate is supported for vertical movement toward and away from the top of the load. This plunger carries the band tightening and securing mechanism which tightens the band about the load, secures the ends of the band together, and cuts off the band to the proper length. The band is supplied from reels usually located to one side of the apparatus.

The banding machine B may have a section of powered conveyor 15 located in opposed relation to the conveyor 10. The powered conveyor 15 may be supplied from a gravity conveyor 16 or another powered conveyor. Oftentimes, the conveyor 16 is arranged at a slight angle to the horizontal so that pallet loads may be assembled on the conveyor while the pallets remain stationary. When the pallet load is complete, a slight push will stop the pallet along the conveyor 16 until it engages the end of the power conveyor 15. At this point, the pallet load will come to a stop unless the conveyor 15 is in operation.

The conveyor 16 may extend between or beside a plurality of taping machines C which tape the manufacturer's joint of the containers and eject them in bundles onto short conveyor sections 17 which may extend toward the conveyor 16. In many instances, the containers leaving the taping machines C are ejected into superimposed relation into a receiving pocket 19, and after a predetermined number of containers have been stacked up, the superimposed containers are pushed onto the conveyor 17 by suitable ejecting mechanism. The stacked containers on the conveyors 17 are usually tied into bundles by twine either manually or through the use of a tying machine.

After the individual bundles have been tied, they are loaded onto pallets or pallet sheets such as 20 and 21 on the conveyor 16. The bundles are placed in predetermined patterns so that the bundles of one layer will dovetail with the bundles of the adjoining layer. When the pallet load is complete, the pallet may be moved along the conveyor 16 toward the powered conveyor 15 leading to the bander B.

Figure 9:
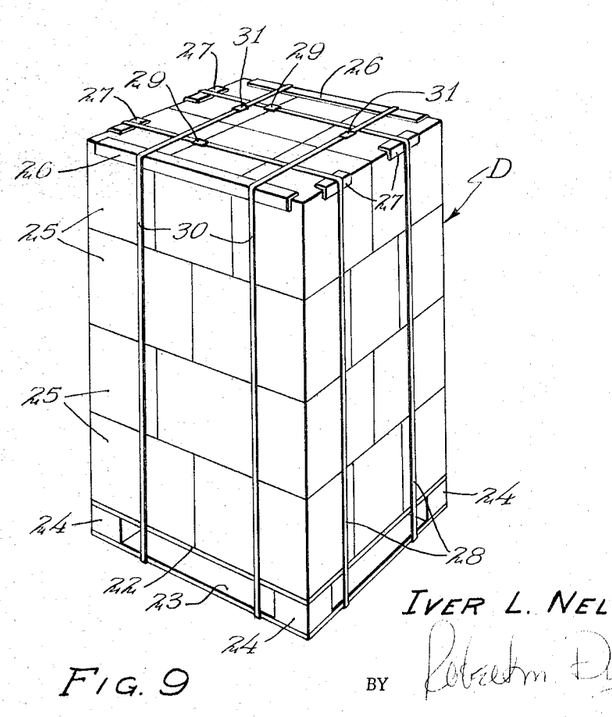
FIGURE 9 is a perspective view of a palletload of containers strapped in two directions.

FIGURE 9 discloses a typical pallet load, the load being diagrammatically indicated by the letter D. In the particular arrangement illustrated, the pallet itself includes a pair of panels 22 and 23 which are supported in spaced parallel relation by suitably positioned spacer blocks 24. As has been previously described, the pallet itself may comprise merely a rectangular sheet of corrugated board or the pallet support may be eliminated entirely if the containers are of large enough size to comprise single bundles laid one above the other.

In FIGURE 9 of the drawings, the pallet load D includes four layers 25 of containers, the bundles forming the layers being shown in block form for simplicity of illustration. Prior to the banding operation, folded strips such as 26 or folded pads 27 are applied to the corners of the pallet load about which the straps are to be tightened. The purpose of the strips 26 and pads 27 is to prevent the straps from cutting into the uppermost and lowermost containers to cause injury thereto.

In the banding operation of the pallet load D, two steel straps or bands 28 are placed to encircle the load, the bands being in parallel relation and being end connected at 29. The pallet load D is then rotated 90° about its vertical axis, and two additional straps or bands 30 are applied, the ends of the bands 30 being anchored together as indicated at 31. As has been previously described, the number of bands applied is a matter of choice.

With reference again to FIGURE 1 of the drawings, it will be noted that the power conveyor section 12 is aligned with an elongated conveyor 32 which extends between a pair of stitching machines E which stitch the manufacturer's joint of the containers. Obviously, the stitchers E could alternatively comprise additional taping machines or gluing machines. The containers which issue from the stitching machines E are bundled, tied in bundles, and assembled on pallets or pallet sheets on the conveyor 32. When the pallet load has been assembled, it is pushed toward the input power conveyor 12 where it will come to a rest until the powered conveyor 12 is driven. The output conveyor 11 which is in opposed relation to the conveyor section 10 leads to an output conveyor 33 which may be gravity operated. The conveyor section 13 also leads to an output conveyor 34 which may be a gravity conveyor to convey the strapped loads through a position from which they may be removed by a lift truck or similar means.

With this arrangement, it will be evident that pallet loads assembled on the conveyor 16 from the output of the taping machines C may pass along the conveyor 16 to the powered conveyor 15 and each pallet may be individually transferred by the conveyor section 15 into the banding device B. Here the pallet may be properly located with respect to the band guides 14 and the bander may be fed into operation to compress the load, encircle the load with bands, tighten the bands, and secure the ends of the bands in load encircling position. The compressing plunger is then raised and the load is banded in one direction.

If it is desired to apply bands in a right angular direction, as in the pallet load D, the conveyor rollers of the banding device B and the conveyor section 10 are operated to deliver the load to the turntable A. The rollers of the outer ring of the turntable A are in parallel relation to the rollers of the conveyor section 10, as will be later described, and the load will be moved into central position on the turntable. The central table of the turntable will be then elevated and the load turned 90°. The rollers of the turntable are then operated in a reverse direction directing the load back over the conveyor section 10 to the bander B, where bands may be applied in a second direction. The manner of accomplishing these results will be described.

Figure 2:
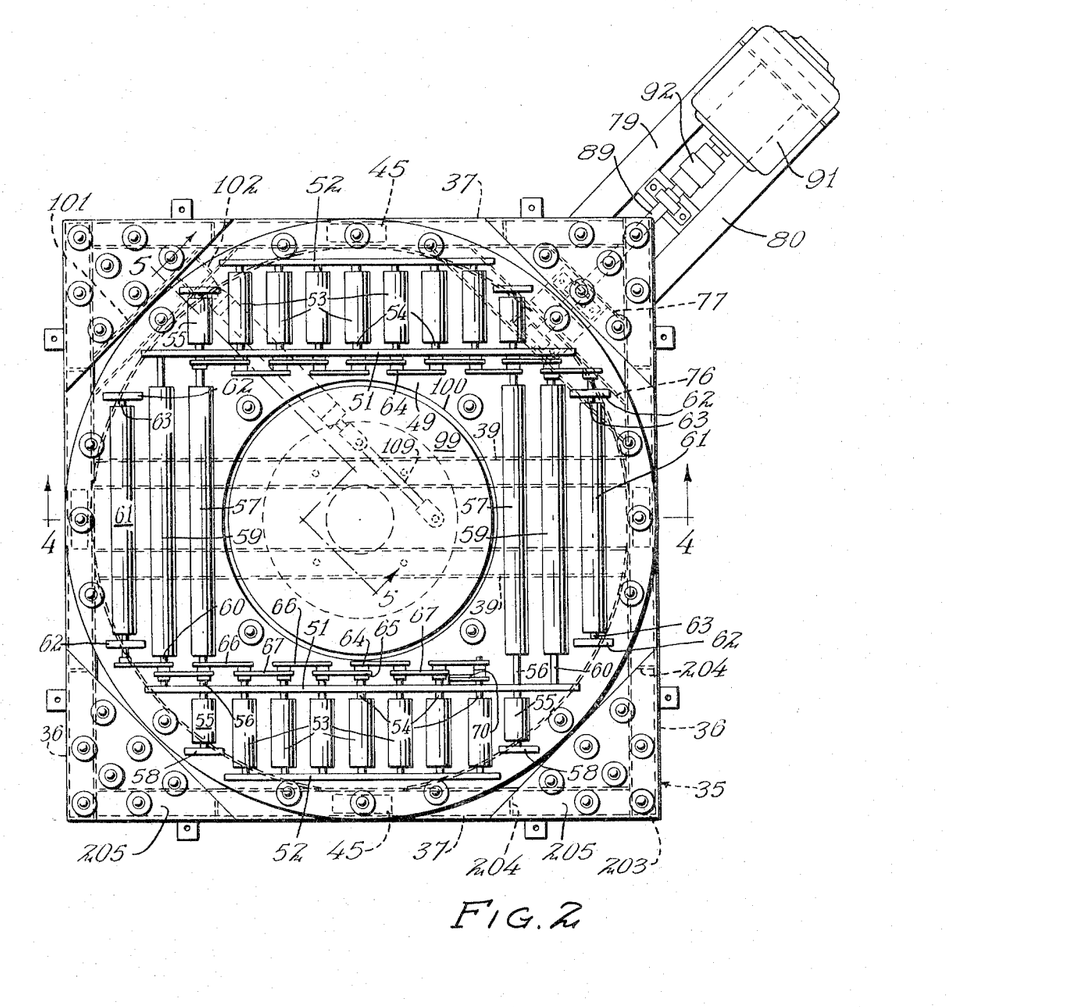
FIGURE 2 is a top plan view of the turntable showing the general arrangement of parts therein.

The turntable A includes a square base frame 35 including parallel side frame members 36 and parallel end frame members 37 welded or otherwise secured at their ends to the frame members 36. A pair of transverse frame members 39 extend from one side frame member 36 to the other side frame member parallel to the end frame members 37, and spaced on opposite sides of the center point between the end frame members 37. The purpose of these transverse frame members 39 is to support the central table of the turntable, as will be later described more in detail.

Figure 3:
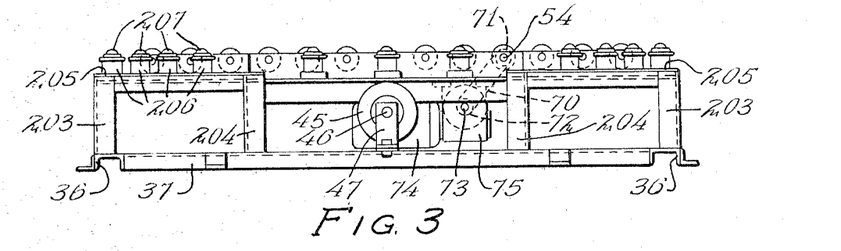
FIGURE 3 is a side elevational view of the turntable structure.
Figure 4:
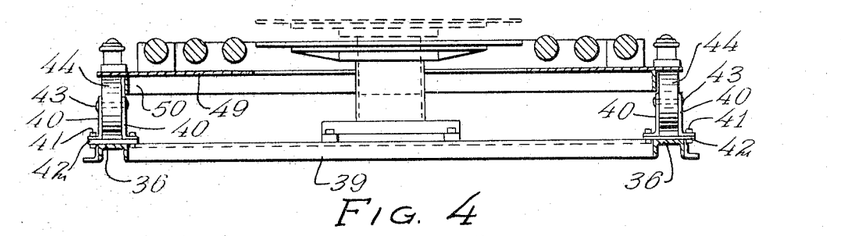
FIGURE 4 is a vertical sectional view through the turntable, the position of the section being indicated by the line 4—4 of FIGURE 2.

As indicated in FIGURES 2 and 4 of the drawings, a pair of opposed angle brackets 40 are bolted as indicated at 41 to bearing plates 42 mounted at the center point of each of the side frame members 36. A pivot shaft 43 extends through the brackets 40 of each pair to support a roller 44. As is indicated in FIGURE 2, a pair of similar rollers 45 are mounted in opposed relation to the end frame members 36. One such roller 45 is shown in FIGURE 3 of the drawings and is shown as supported by a pivot shaft 46 extending through brackets 47 extending upwardly from the end frame member 37. The axes of the rollers 45 are at right angles to the axes of the rollers 44, and the rollers 44 and 45 combine to support a ring-shaped disc 49 which forms the support for the outer ring of the turntable. A cylindrical band or flange 50 extends downwardly from the undersurface of the disc 49 inwardly of the rollers 44 and 45 to hold the disc 49 in centered position. The disc 49 supports a series of conveyor rollers which are arranged to provide a central aperture. All of the rollers are connected together for rotation in unison.

A pair of inner parallel roller supporting bars 51 extend upwardly from the surface of the ring-shaped disc 49 on opposite sides of the central aperture therein. Parallel outer roller supporting bars 52 extend upwardly from the disc 49 near the outer periphery of the disc. The outer roller supporting bars are somewhat shorter than the inner bars 51 due to the curvature of the outer periphery of the disc 49. A series of parallel conveyor rollers 53 are supported upon parallel shafts 54 extending through the bars 51 and 52, the upper surfaces of the rollers 53 extending somewhat above the upper surface of the supporting bars. At the end of each series of rollers 53, shorter rollers 55 are provided, the supporting shafts 56 of the rollers being supported by the inner roller supporting bars 51 and by auxiliary upright bars 57 located between the supporting bars 51 and the outer periphery of the disc 49. The shafts 56 which support the rollers 55 extend entirely across the disc 49 from one roller supporting bar 51 to the opposite such bar. Rollers 57 are provided on the shafts 56 between the supporting bars 51. An additional roller 59 is supported upon a parallel shaft 60 between the supporting bars 51 and outwardly of the rollers 57. Shorter conveyor rollers 61 are mounted outwardly of the rollers 59 by brackets 62 on the disc 49, the shafts 63 of the rollers 61 extending to the brackets 62.

Each of the shafts 54 is provided with a pair of axially spaced sprockets, the innermost sprockets being indicated by the numeral 64, and the outermost sprockets being indicated by the numeral 65. Chains 66 connect alternate pairs of adjacent inner sprockets 64 while similar chains 67 connect the remaining alternate sprockets 65. One last chain of the series of chains on one side of the conveyor is connected to a similar sprocket on the shaft 56 of the roller 57, and the shafts 60 and 63 of the rollers 59 and 61 are also connected by similar sprockets and chains. The rollers on opposite sides of the conveyor are connected for movement in unison with the shafts 56 of the rollers 57 which extend from one side to the other of the conveyor system. Thus, all of the rollers which have been described are connected together to operate in unison.

In order to drive the conveyor rollers selectively in either direction, one of the shafts 54 is chain connected to the drive shaft of a gear reduction unit connected to a reversible motor mounted on the undersurface of the disc 49. The drive chain is indicated by the numeral 70 and is shown in FIGURE 2 near the lower right hand side of the conveyor system. FIGURE 3 of the drawings indicates the chain 70 as connecting the sprocket 71 on one of the shafts 54 to a cooperable sprocket 72 on the drive shaft 73. The drive shaft 73 is connected to the motor 74 through a gear reduction unit 75.

Figure 6:
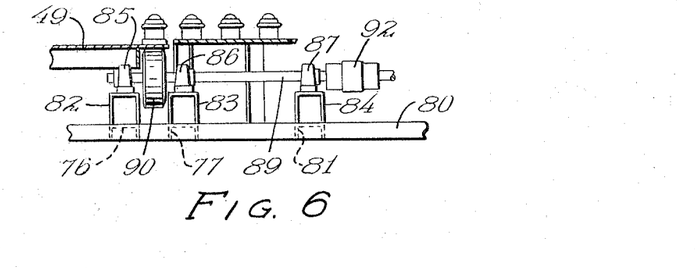
FIGURE 6 is a side elevational view, partially in section, showing diagrammatically the means employed for rotating the outer ring of the turntable.

As indicated in FIGURES 2 and 6 of the drawings, a pair of channels 76 and 77 extend diagonally across one corner of the base frame from one side frame member 36 to the adjacent end frame member 37. A pair of parallel frame members 79 and 80 also extend radially from a corner of the base frame, this frame being shown near the upper right hand side of FIGURE 2. A transverse channel 81 extends between the frame members 79 and 80 intermediate the ends thereof. Parallel box shaped beam sections 82, 83, and 84 extend upwardly from the diagonal channels 76 and 77 and from the cross channel 81 to support aligned bearings 85, 86, and 87. A drive shaft 89 is supported extending through the bearings 85, 86, and 87 and supports a drive roller 90 between the bearings 85 and 86. The roller 90 is in frictional engagement with the undersurface of the ring shaped disc 49 at the outer periphery thereof, and the disc may be selectively driven in either rotative direction about its vertical axis by rotation of the shaft 89. A motor 91 is connected to the shaft 89 through a suitable coupling 92, the motor 91 being supported by the parallel frame members 79 and 80.

From the foregoing description, it will be evident that the outer ring of the turntable may rotate or oscillate through a predetermined angular distance so that the rollers of the turntable may be moved into parallel relation with the rollers of any of the input or output conveyors which have been described. In any position of the outer ring of the turntable, the conveyor rollers may be powered to move the load supported on the turntable onto, off, or across the turntable.

Figure 5:
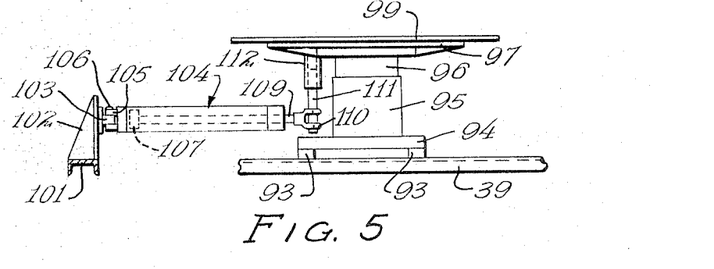
FIGURE 5 is a diagrammatic sectional view on a vertical plane substantially on the line 5—5 of FIGURE 2, portions of the turntable being eliminated to disclose the mechanism for rotating the central table.

With reference now to FIGURES 4 and 5 of the drawings, the structure of the central table will be described. As indicated, a pair of cross bars 93 connect the transverse frame members 39 on opposite sides of the center point of these transverse frame members. The base plate 94 of a vertical cylinder 95 is mounted upon the cross members 93. The cylinder 95 is provided with an open upper end through which a plunger 96 extends. A bearing plate 97 is supported at the upper end of the plunger 96 and the bearing plate 97 supports the circular disclike central table 99. As is evident from FIGURE 2 of the drawings, the outer diameter of the table 99 is slightly less than the inner diameter of the center aperture 100 in the disc 49.

As is indicated in FIGURE 2 of the drawings, a diagonally angled frame member 101 extends across the upper left hand corner of the base frame, extending from one side frame member 36 to the adjoining end frame member 37. A bracket 101 is secured to the upper surface of the diagonally extending frame member 101 to extend upwardly therefrom as indicated in FIGURE 5 of the drawings. A pivot lug 103 extends horizontally from the bracket 102 for the purpose of supporting one end of the fluid cylinder 104. The cylinder 104 is provided with a bifurcated end 105 which straddles the lug 103 and is pivotally connected to the lug by means of a vertical pivot 106. The cylinder 104 contains a piston 107 connected to a piston rod 109 which extends from the end of the cylinder 104 most remote from the bifurcated end 105 thereof. A bifurcated clevis 110 is connected to a vertical shaft 111 which extends into a sleeve or socket 112 extending downwardly from the undersurface of the bearing plate 97. The shaft 111 and socket 112 are in telescoping relation so that the table 99 may be raised or lowered relative to the piston rod 109.

The piston rod 109 is shown in both extreme positions in FIGURE 2 of the drawings, the contracted position of the piston rod being shown in dotted lines and the extended position being in broken lines. As will be evident from this view, the cylinder 104 is capable of rotating the table 99 through an angle of 90° as it is never necessary to rotate the table to any greater extent when the two conveyor systems are in right angular relation as described.

Figure 8:
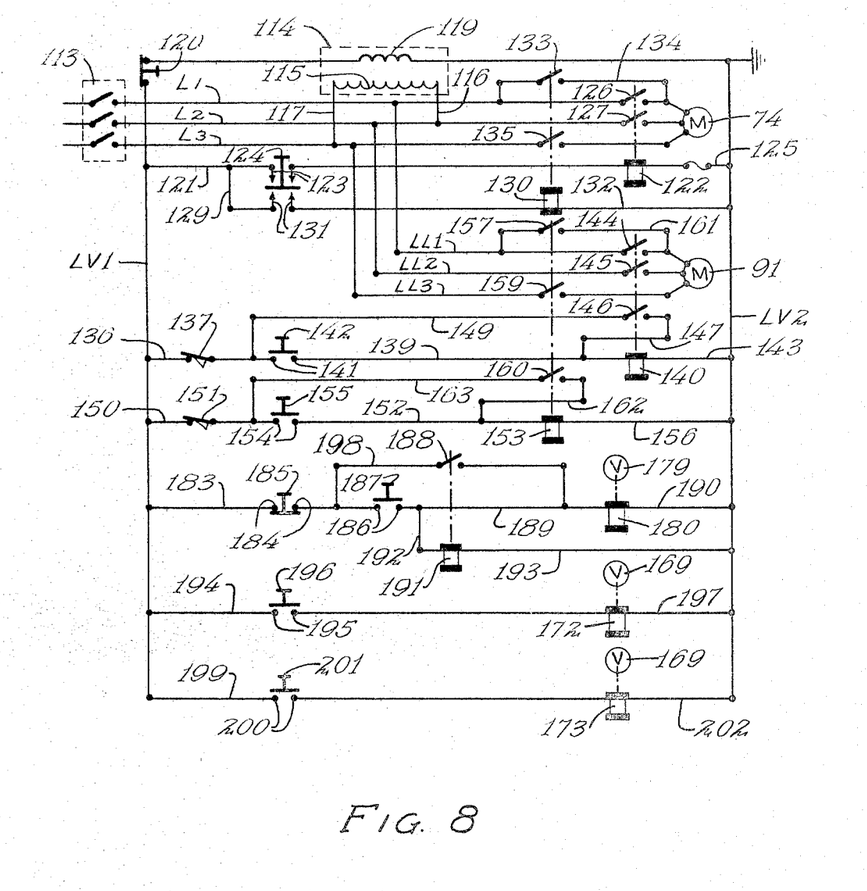
FIGURE 8 shows the wiring diagram of the electrically-operated portions of the apparatus.

The wiring diagram of the apparatus is illustrated in FIGURE 8 of the drawings. The three-phase current supplying the apparatus is indicated by the line wires L-1, L-2, and L-3. These wires are controlled by a master switch indicated at 113. For the purpose of simplifying the description, the line wires L-1, L-2, and L-3 are shown as supplying current to the motor 74 which drives the turntable conveyor rollers. Extensions of these line wires are indicated at LL-1, LL-2, and LL-3, which control the circuit to the motor 91 which rotates the outer ring of the turntable in either direction through an angular distance of 90°.

A third circuit is provided for the control elements of the system as well as for the valves which control the fluid system. A transformer 114 is shown having a primary coil 115, one terminal of which is connected by conductor 116 to line wire L-2, and the other terminal of which is connected by conductor 117 to L-3. The secondary coil 119 of the transformer 114 has one terminal connected to a low voltage line wire LV-1 through a normally closed emergency stop switch 120. The other terminal of the secondary transformer coil 119 is connected to line wire LV-2.

A conductor 121 extends from LV-1 to a relay coil 122 through a normally open switch 123 controlled by a manually operable switch blade 124. The other terminal of the relay coil 122 is connected by conductor 125 to LV-2. Relay coil 122 controls the operation of a normally open switch 126 interposed in the line wire L-1 leading to the motor 74. The relay coil 122 also controls the normally open switch 127 in line wire L-2 leading to the motor 74.

A conductor 129 also connects LV-1 to a second relay coil 130 through a pair of normally open contacts 131 which may also be selectively closed by the manually operable switch blade 124. The other terminal of the relay coil 130 is connected to LV-2 through conductor 132.

The relay coil 130 controls a normally open switch blade 133 in a conductor 134 connected to the line wire L-1 in shunt relation to the switch 126. The relay coil 130 also simultaneously controls a normally open switch 136 in line wire L-3 leading to the motor 74.

From this description it will be seen that when the manually operable switch 124 bridges the normally open contacts 123, a circuit will be closed to the relay coil 122 which closes the switches 126 and 127, energizing the motor 74 through the line wires L-1 and L-2. The energization of the coil 122 thus drives the motor 74 in one direction. When the switch 124 is manipulated to bridge the contacts 131, a circuit is closed to the relay coil 130 thus closing the switches 133 and 135. Closing of these switches connects the line wires L-1 and L-3 to the motor 74 rotating the motor 74 in a reverse direction.

The low voltage circuit also actuates controls which rotate the turntable turning motor 91 in either direction. LV-1 is connected by a conductor 136 to a normally closed limit switch 137. The other terminal of the limit switch 137 is connected by conductor 139 to a solenoid coil 140 through a pair of normally open contacts 141 of a manually operable turn switch 142. The other terminal of the relay coil 140 is connected to LV-2 by a conductor 143. The energization of the relay coil 140 acts to simultaneously close the normally open switches 144, 145, and 146. Switch 144 controls the flow of current from line wire LL-1 to the motor 91. Switch 145 controls the current from line wire LL-2 to the motor 91. Thus, when the switches 144 and 145 are closed, the motor 91 will operate in one direction to rotate the outer ring of the turntable in one direction.

The switch 146 controls a relay holding circuit including conductor 147 connected to the conductor 139 between the switch 142 and the relay coil 140 and also the conductor 149 which connects the switch 146 to the conductor 139 between the limit switch 137 and the manually operable switch 142. In other words, the switch 146 is in shunt relation to the manual switch 142, and maintains the relay coil 140 energized until the circuit is broken through the limit switch 137. The limit switch is opened by the rotation of the turntable disc 49 to one extreme position.

A conductor 150 connects LV-1 to one terminal of a normally closed limit switch 151, the other terminal of which is connected by conductor 152 to a relay coil 153 through the normally open contacts 154 of a manually operable return switch 155. The other terminal of the relay coil 153 is connected by conductor 156 to LV-2 to complete the circuit. The relay coil 153 controls three normally open switches 157, 159, and 160. The switch 157 is in a conductor 161 which is in shunt relation to the switch 144. In other words, the line wire LL-1 may be connected to the motor 91 either through the closing of switch 144 or switch 157. Switch 159 controls the flow of current from LL-3 to the motor 91. When the switches 157 and 159 are closed, the motor 91 will operate in a reverse direction.

The switch 106 controls a holding circuit including conductors 162 and 163, the switch 160 being in shunt relation to the manually operable switch 155. Thus, once the return switch 155 has been momentarily closed, energizing the relay coil 153, the circuit to the relay coil 153 will be maintained until it is broken through the limit switch 151. The limit switch 151 is opened by rotation of the turntable disc 49 to its other extreme position.

The fluid diagram will now be described so that the electrical operation of the fluid system may be more readily understood. In the particular arrangement, illustrated, a portion of the system is operated hydraulically, and the raising and lowering of the central table is operated pneumatically. Obviously, this may be varied as desired. As shown diagrammatically in FIGURE 7, the hydraulic system includes a reservoir 164 designed to hold a supply of hydraulic fluid. A pump 165 is arranged to draw hydraulic fluid through the suction line 166 and force it through the conduit 167 onto a reversing valve 169. A return line 170 is provided from the reversing valve 169 and a pressure relief valve 171 is interposed between the conduits 167 and 170 to bypass fluid from the pump 165 when the valve 169 is closed.

The position of the valve 169 may be moved from its normally closed position diagrammatically illustrated in FIGURE 7 to a pair of opposite extreme positions by a pair of solenoids 172 and 173 which will be later described in conjunction with the electrical diagram. The valve 169 controls the flow of fluid through a pair of conduits 174 and 175 to opposite ends of the table turning piston in the cylinder 104. When fluid from the pump is directed through the line 174, the hydraulic fluid is directed to the left of the piston 107 in the cylinder 104, turning the table 99 in one rotative direction. The fluid to the right of the piston 107 flows through the return line 107 and through the valve 169 to the return conduit 170. When the valve 169 is in its other extreme position, the fluid from the pump will flow through the conduit 167 and conduit 175 to the right end of the cylinder 104 as viewed in FIGURE 7, forcing the piston 107 to the left and returning the table 99 to its normal position. The hydraulic fluid to the left of the piston 107 will flow through the return line 174 and valve 169 to the return line 170 leading to the reservoir 164.

Figure 7:
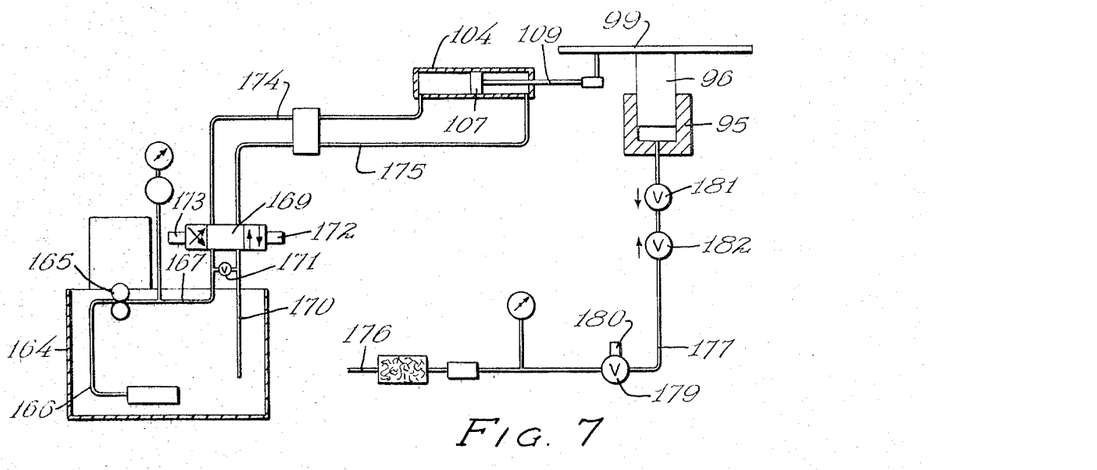
FIGURE 7 is a diagrammatic view showing the hydraulic system, showing the fluid-operated means for raising and lowering the central table as well as for rotating the same.

FIGURE 7 also shows an air supply pipe 176 connected to the lower end of the cylinder 95 through a conduit 177 including a solenoid operated control valve 179. When the valve 179 is open, the fluid may flow beneath the plunger 96, raising the plunger and the table 99 connected thereto. The table remains in elevated position as long as the valve 179 is open. When the circuit to the solenoid 180 controlling the valve 179 is opened, the air in the lower end of the cylinder 95 may be vented to atmosphere, allowing the plunger 96 to lower into its normal position. The conduit 177 may include a pair of speed control valves 181 and 182, one of which controls the flow of air to the cylinder 95, regulating the speed of movement of the plunger 96 while the other controls the flow of air to atmosphere, regulating the speed of lowering the plunger. It is usually necessary to release the air in the cylinder 95 slowly enough so that the table and load supported thereby do not drop abruptly.

With reference again to FIGURE 8 of the drawings, it will be noted that a conductor 183 leads from LV-1 through the normally closed contacts 184 of a plunger lowering switch 185 to the normally open contacts 186 of a manually operable switch 187 which is used to raise the plunger 96. The closing of the switch 187 connects LV-1 through a conductor 189 to one terminal of the solenoid 180 controlling the valve 179, the other terminal of which is connected by conductor 190 to LV-2. Conductor 189 is also connected to one terminal of a relay coil 191 through a conductor 192, and the other terminal of the relay coil 191 is connected by conductor 193 to LV-2. The relay coil 191 controls the operation of a switch 194 in a conductor 195 bridging the manually operable raise switch 187 so that the switch 194 is in shunt relation to the manually operable switch 187 and forms a holding circuit for the solenoid coil 180 as long as both switches 185 and 187 are closed. As a result, the solenoid coil 180 remains energized maintaining the valve 179 in open position until the circuit is broken through the normally closed manual switch 185 which opens the circuit to the solenoid and also to the relay coil 191, allowing the plunger 96 and table 99 to lower to a position below the level of the turntable conveyor rollers.

The circuit also includes a means of controlling the solenoids 172 and 173 which actuate the hydraulic cylinder 104 to rotate the table 99 in either direction. A conductor 194 leads to one terminal of the solenoid 172 through the normally open contacts 195 of a manually operable switch 196. The other terminal of the solenoid 172 is connected to LV-2 through conductor 197. Thus as long as a manually operable switch 196 is closed, the current to the solenoid 172 will be energized and the piston 107 will move in one direction to turn the table 99 in a corresponding direction. Obviously, at the extremity of movement of the piston 107, the fluid will bypass through the pressure relief valve 171.

In a similar manner, a conductor 199 is connected to LV-1 and extends to one terminal of the return valve solenoid 173 through a pair of normally open contacts 200 of the manually operable return valve 201. The other terminal of the solenoid 173 is connected by conductor 202 to LV-2 to complete the circuit. Thus when the manually operable return switch 201 is closed, the current to the solenoid 173 will be closed causing movement of the piston 107 in a return direction.

As is indicated in FIGURES 2 and 3 of the drawings, uprights 203 extend upwardly from the corners of the base frame formed by the right angularly extending channels 36, 37, and similar uprights 204 extend vertically from each of the frame members 36, 37 at points spaced from the ends of these members. The uprights 203 and 204 support triangular gusset plates 205 at each corner of the turntable, the plates 205 being on a common horizontal plane somewhat below the level of the conveyor rollers. The plates 205 support a series of spherical bearing supports 206 which are provided with spherical bearings 207 having their upper surfaces substantially on a common plane with the upper surfaces of the conveyor rollers. These bearings 207 merely support portions of the pallets as the pallets are moved across the turntable.

The operation of the apparatus is believed obvious from the foregoing description. The pallet may be driven onto the turntable by turning the conveyor rollers on the turntable into parallel relation to one of the input conveyors, such as conveyor 10. The conveyor rollers are rotated by operation of the switch 124 to move the pallet to the center of the turntable. If it is desired to turn the entire pallet through an angle of 90° so as to discharge the pallet to the output conveyor 34, one of the switches 142 or 155 is closed to energize the motor 91. The momentary closing of the switch 142 or 155 will close a holding circuit to the motor, and the motor will continue until the load has been turned 90°. At this point, the switch 124 may be manually closed to move the load from the turntable onto the discharge conveyor 34.

If it is desired to rotate the load and return it in the same direction from which it has come, when the load reaches the center of the turntable, the circuit to the motor 74 is opened and the switch 187 is closed momentarily. This action closes the holding circuit to the solenoid valve 180, and air enters the bottom of the cylinder 95 to raise the table 99 and the load supported thereby. When the load has been elevated by the plunger, one of the switches 196 or 201 is closed, and the table 99 is rotated through 90° by the piston 107 in the cylinder 104. The table 99 is then lowered by opening the switch 185 to release the air from the cylinder 95 and the load is again lowered onto the conveyor rollers of the turntable. The switch 124 may then be energized to return the load to the conveyor 10, and, accordingly, into the banding machine B.

It will be seen that by providing an independent rotable table in the center of the turntable, the load may be rotated 90° independently of the conveyor rollers. This makes it possible to band the load in one direction, turn it 90° on the turntable 99 and return it to the banding machine. The arrangement also permits the turntable conveyor rollers to be rotated into alignment with any of the radially extending input or output conveyors so as to receive loads therefrom or to discharge loads thereto. As a result, the labor usually involved in manually turning the loads may be eliminated, and a single operator may manipulate the heavy pallet loads quickly and efficiently.

In accordance with the patent statutes, I have described the principles of construction and operation of my pallet handling apparatus; and while I have endeavored to set forth the best embodiments thereof, I desire to have it understood that obvious changes may be made within the scope of the following claims without departing from the spirit of my invention.

I claim:
1. A turntable device for unitized loads including:
   a ring rotatably supported for pivotal movement about a vertical axis,
   roller means supported in parallel relation on substantially horizontal axes on said ring and adapted to support a load,
   a table pivotally supported on a vertical axis within said ring and concentric therewith,
   said table being arranged on a plane at least no higher than the upper surface of said rollers, and
   means for vertically reciprocating said table to a plane above the plane of the upper surfaces of said rollers,
   said roller means including two sets of parallel rollers on diametrically opposite sides of said table adapted to support a load before and after it has passed over said table, and parallel aligned pairs of rollers between said sets of rollers adapted to support a load while passing over said table, all of said rollers being outwardly of the periphery of said table.

2. The structure of claim 1 and including means connecting said rollers for rotation in unison.

3. The structure of claim 2 and including means connected to said rollers for selectively rotating the same in either direction.

4. A turntable device for unitized loads including:
   a turntable ring,
   means rotatably supporting said ring for pivotal movement about a substantially vertical axis,
   a series of conveyor rollers supported by said ring on parallel axes arranged in a substantially common horizontal plane,
   means connecting said rollers for rotation in unison,
   a plurality of roller conveyor sections extending radially in angularly spaced relation from the center of said ring,
   means connected to said ring to pivot said rollers into parallel relation to the rollers of any of said roller conveyor sections,
   a table within said turntable ring and pivotally supported on a vertical axis concentric with said turntable ring,
   the upper surface of said table being normally no higher than the upper surfaces of said rollers, and
   means connected to said table for raising said table above the level of said conveyor rollers,
   said roller means including two sets of parallel rollers on diametrically opposite sides of said table adapted to support a load before and after it has passed over said table, and parallel aligned pairs of rollers between said sets of rollers adapted to support a load while passing over said table, all of said rollers being outwardly of the periphery of said table.

5. A turntable device for unitized loads including:
   a turntable ring,
   means rotatably supporting said ring for pivotal movement about a substantially vertical axis,
   a series of conveyor rollers supported by said ring on parallel axes arranged in a substantially common horizontal plane,
   means connecting said rollers for rotation in unison,
   a plurality of roller conveyor sections extending radially in angularly spaced relation from the center of said ring,
   means connected to said ring to pivot said rollers into parallel relation to the rollers of any of said roller conveyor sections,
   a table within said ring inwardly of said rollers,
   a plunger concentric with said table and extending downwardly therefrom,
   a cylinder beneath said table slidably and rotatably supporting said plunger,
   said table being normally below the level of the upper surfaces of said rollers, and
   a source of fluid connected to said cylinder to raise said plunger to elevate said table above the level of said rollers.

6. The structure of claim 5 and including drive means supported by said ring and connected to said rollers to selectively rotate the same in either direction.

7. The structure of claim 5 and including means connected to said table to rotate the same.

8. The structure of claim 5 and in which said conveyor sections are power conveyors.

9. A turntable for device for unitized loads including:
   a turntable ring,
   a series of angularly spaced ring supporting rollers,
   means supporting said ring supporting rollers in angularly spaced relation on axes extending radially from the center of said ring,
   a series of conveyor rollers,
   means supporting said conveyor rollers on said ring on parallel axes arranged in a substantially common horizontal plane,
   a table supported within and concentric with said ring and inwardly of said rollers on said ring,
   a plunger and cylinder device concentric with said table and rotatably and reciprocably supporting said table,
   a fluid actuated cylinder and piston connected between said table and a fixed point for rotating said table through an angle of ninety degrees,
   two pairs of conveyor sections arranged at ninety degrees about the center of said ring and with the conveyor sections of each pair in diametrically opposed relation,
   the conveyor rollers on said ring being movable with said ring into alignment with either of said pairs of conveyor sections,
   a fluid source connected to said plunger cylinder to raise said table from a position below the level of said conveyor rollers on said ring to a position above the level thereof, and
   a fluid source connected to said fluid actuated cylinder and selectively operable to direct fluid to either end thereof to reciprocate said piston and to rotate said table through an angle of ninety degrees.

10. The structure of claim 9 and including a roller frictionally engaging said ring, and means for selectively rotating said last named roller in either direction to rotate said ring.

References Cited by the Examiner

UNITED STATES PATENTS

| | | | |
|---|---|---|---|
| 2,897,948 | 8/1959 | Cranston | 198—33 |
| 2,932,412 | 4/1960 | Martin | 193—33 X |
| 3,090,607 | 5/1963 | Johnson | 198—209 X |
| 3,100,039 | 8/1963 | Oderman et al. | 198—33 |

EVON C. BLUNK, *Primary Examiner.*

R. J. HICKEY, *Assistant Examiner.*